United States Patent [19]

Grone

[11] Patent Number: 4,601,775
[45] Date of Patent: Jul. 22, 1986

[54] COMPLIANT PRESSER MEMBER FOR COMPOSITE TAPE LAYING MACHINE

[75] Inventor: Robert J. Grone, Elsmere, Ky.

[73] Assignee: Cincinnati Milacron Inc., Cincinnati, Ohio

[21] Appl. No.: 740,708

[22] Filed: Jun. 3, 1985

[51] Int. Cl.⁴ ............................................ E04D 15/06
[52] U.S. Cl. ............................ 156/523; 29/116 R; 156/488; 156/574
[58] Field of Search ............... 156/523, 526, 574, 577, 156/486, 488, 492; 29/116 R

[56] References Cited

U.S. PATENT DOCUMENTS

| | | | |
|---|---|---|---|
| 1,717,372 | 6/1929 | Davenport | 29/116 R |
| 2,446,211 | 8/1948 | Clark | 29/116 R |
| 2,593,158 | 4/1952 | Lorig | 29/116 R |
| 3,037,449 | 6/1962 | Aller | 29/116 R X |
| 4,460,433 | 7/1984 | Boyd | 29/116 R X |

Primary Examiner—David Simmons
Attorney, Agent, or Firm—Thomas M. Farrell

[57] ABSTRACT

The interior structure of a tape laydown shoe or roller has an axle supporting solid rings, shoe members, and the like on ball joints. Thus, the solid members adapt to surface contour changes to back up an elastomeric facing element. The ball joints provide for force division of the principal tape head force into plural components directed at the contour surfaces.

12 Claims, 16 Drawing Figures

COMPLIANT PRESSER MEMBER FOR COMPOSITE TAPE LAYING MACHINE

BACKGROUND OF THE INVENTION

The invention relates generally to composite tape laying machines for creating laminated structures, wherein the composite tape plys are detruded by a tape head presser member such as a roller or skidding shoe.

In particular, the invention relates to composite tape laying machines where the tape laydown surface has a changing contour, especially across the presser member face.

It is well-known in composite tape laying machine art that the tape laying head may be oriented around the tape laying path, so that the tape presser member face will remain generally parallel to the tape surface. Where the tape laydown surface experiences contour changes across the presser member face, it has been known in the art to provide an elastomeric or rubber tire to a roller, and to provide a similarly deformable skin to a presser member shoe. Presumably, the elastomeric member must become thicker to accommodate more radical changes in contour, since the rigid backing element possesses no flexibilty for adapting to the contour. In contrast to the prior art, applicant has conceived of a new structure for a type presser member, wherein the member embodies discreet solid alignable elements which serve as backup members to an elastomeric band commonly uniting the members. The movable solid members are embodied in a force dividing mechanism for proportioning the laydown force to the respective elements, thereby creating a better compacting and laydown situation.

It is therefore an object of the present invention, to provide a tape presser member assembly which is mechanically adaptable to a variety of surface contours especially along the face of the presser member.

It is also an object of the present invention to provide a force dividing mechanism within a tape presser member, to tend to create a better compaction and laydown situation.

SUMMARY OF THE INVENTION

The invention is shown embodied in a tape presser member assembly of a tape laying head utilized in a tape laminating machine, wherein the presser member assembly comprises a presser frame coupled to the head, and an axle is carried by the frame substantially parallel to the tape laydown surface. A force divider mechanism is carried by the axle within the tape presser member for dividing the frame pressing force, i.e., a radial force of the axle, into at least two separate radial components. The components are directed through movable solid elements into a distortable elastomeric presser strip which spans and connects the movable members.

In the preferred embodiment, the force divider means and solid members comprise in part spherical ball segments and companion outer races which permit the assembly to universally adapt to a variety of surface contours.

BRIEF DESCRIPTION OF THE DRAWINGS

FIG. 4b is an alternate diagrammatic embodiment of the mechanism of FIG. 4a.

DESCRIPTION OF THE PREFERRED EMBODIMENT

Figure 1:
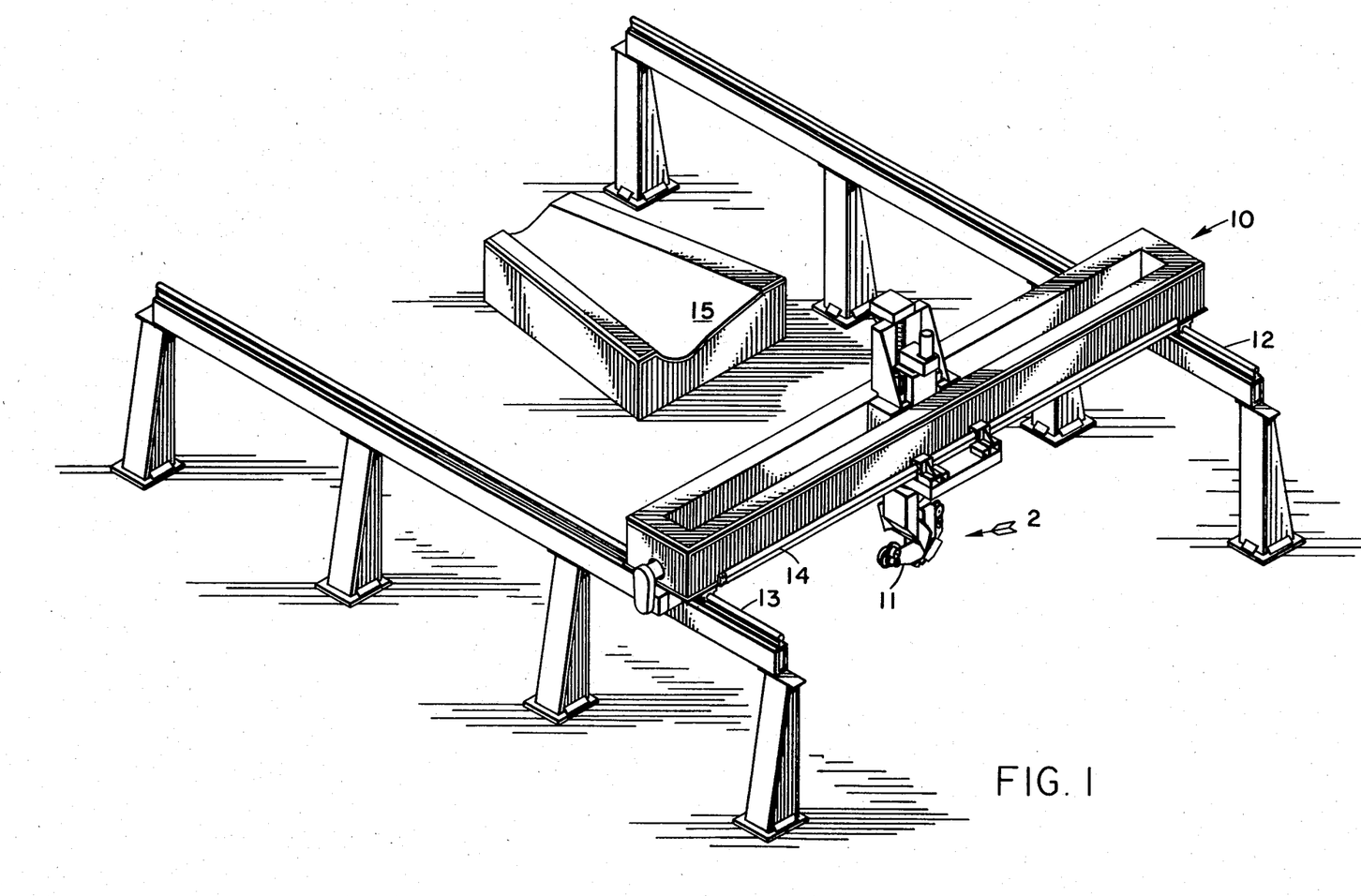
FIG. 1 is a perspective view of a tape laminating machine.

FIG. 1 of the drawings depicts a high rail gantry tape laying machine 10 wherein a tape laying head 11 is transported coordinately on side rails 12,13 and transverse gantry rails 14. A contoured tape laydown surface 15 is positionable with respect to the tape laying head 11 to form laminated composite structures.

Figure 2:
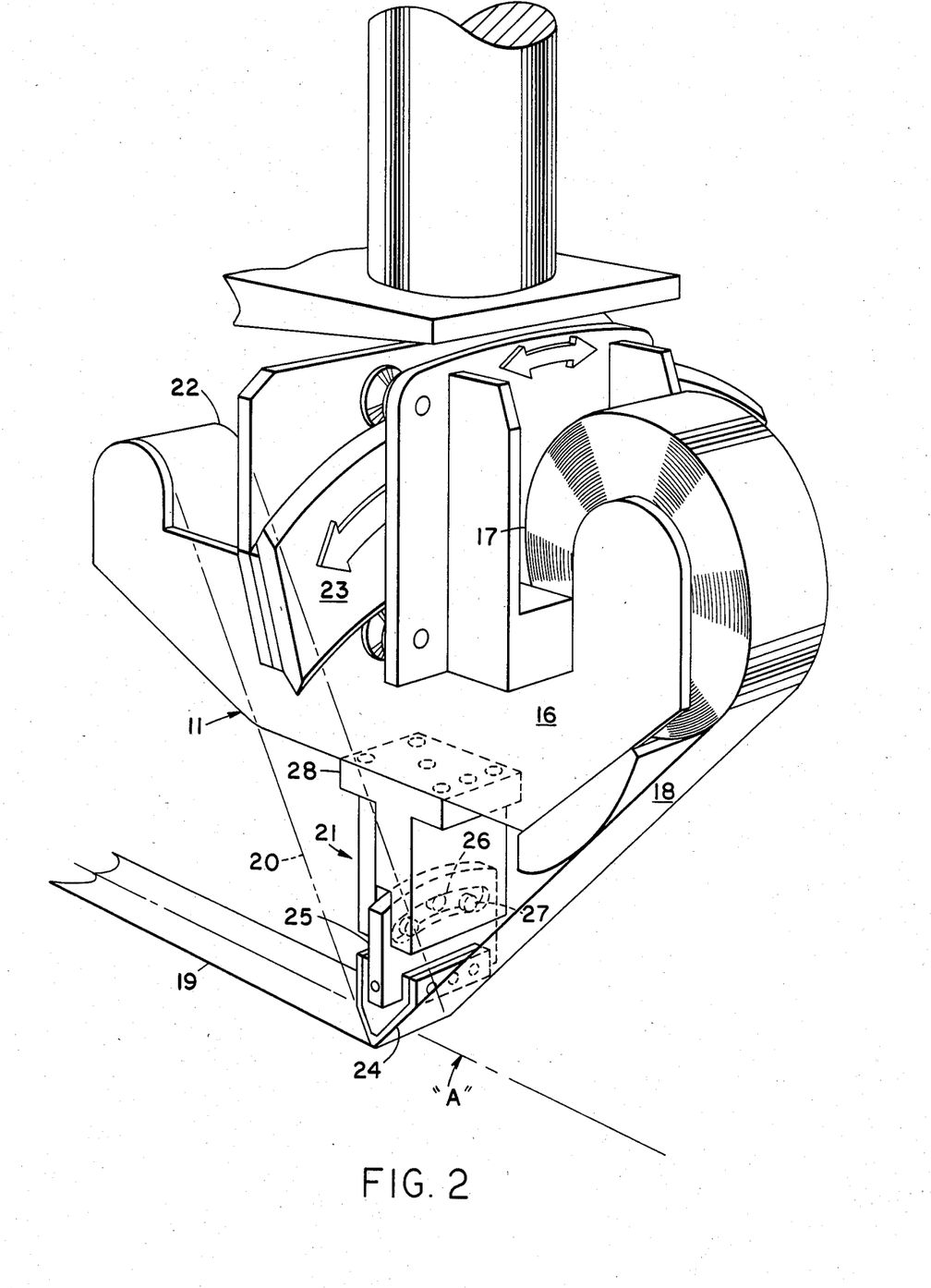
FIG. 2 is a perspective view of a tape laying head taken in the direction of arrow 2 of FIG. 1.

The close-up perspective view of FIG. 2 illustrates the tape laying head 11 as comprising in part, a main frame 16 supporting a tape supply reel 17 carrying a tape structure 18 comprises of filamentous composite tape 19 and a backing paper tape 20. The tape structure 18 is trained across a tape presser member assembly 21 and the backing paper tape 20 is accumulated on a take-up reel 22. The tape laying head main frame 16 is rotatable on a circular way system 23 about the tape laying path axis "A". A presser shoe assembly 24 is depicted as part of the tape presser member assembly 21 and, while the shoe assembly 24 may be carried in a variety of shoe support structures, the preferred embodiment herein illustrates the shoe assembly 24 as being carried in a cam plate 25 forming a yoke which also is rotatable about axis A, independent of the tape head main frame rotation. Basically, the cam plate rotation is effected by a circular track 26, concentric with the circular way system 23, supported on cam followers 27 in the T-block 28 of the presser member assembly 21.

FORCE DIVIDER

Figure 3:
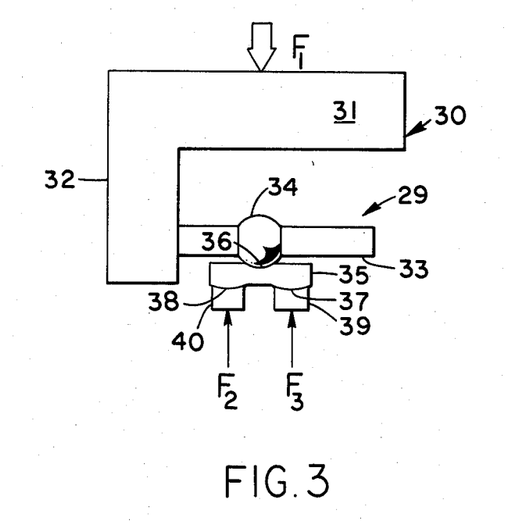
FIG. 3 is a diagrammatic view of a force divider mechanism.

FIG. 3 depicts in diagrammatic form a force divider 29 for a tape presser member assembly 30 consisting elementally of a presser frame 31 upon which a downward force, $F_1$, is directed. The vertical leg 32 of the presser frame 31 has a horizontal axle 33 and integral ball element 34. A solid member 35 has a curved raceway 36 in contact with the bottom of the ball element 34, and a pair of spaced outer ball segments 37,38 are provided on the solid member 35. Outer race elements 39,40 are adapted to the two spaced-apart ball segments 37,38 and, from simple mechanics it can therefore be shown that reaction loads on the outer race elements 39,40 may be designated as $F_2$ and $F_3$, wherein $F_1$ equals $F_2$ plus $F_3$. The respective values of $F_2$ and $F_3$ are dependent upon the respective spacings from the application point of force $F_1$.

Figure 4A:
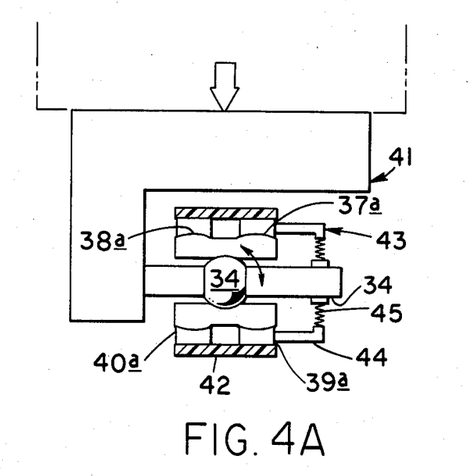
FIG. 4a is a diagrammatic view of a presser member embodiment of the force divider mechanism of FIG. 3.
Figure 4B:
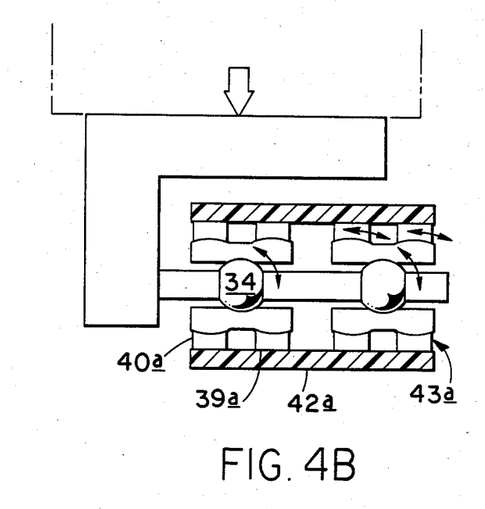

FIG. 4a depicts, in diagrammatic form, a structural embodiment of the force divider 29 of FIG. 3 in a tape presser assembly 41, having the outer raceways 39a,40a being completely circular about spherical ball segments 37a,38a, and joined together by an elastomeric sleeve 42. Thus, it can be seen that the assembly has a great degree of universal motion about the central ball element 34, and, in fact may tend to remain in certain deformed positions, unless a restorative biasing mechanism 43 is employed. The biasing mechanism 43 herein depicted is a circular 44 ring having spring supports 45 about the central axle 33 to provide for a normal or home position of the assembly when the distortion forces of the presser member are removed. FIG. 4b is an alternate embodiment of the elements of FIG. 4a, wherein a plurality of like assemblies are employed, banded together by a common elastomeric sleeve 42a. In the mechanism depicted, the outboard assembly serves as the restorative biasing element 43a, and the assembly, in its undistorted state, will return to the normal or home position depicted.

GEOMETRY

Figures 5, 6:
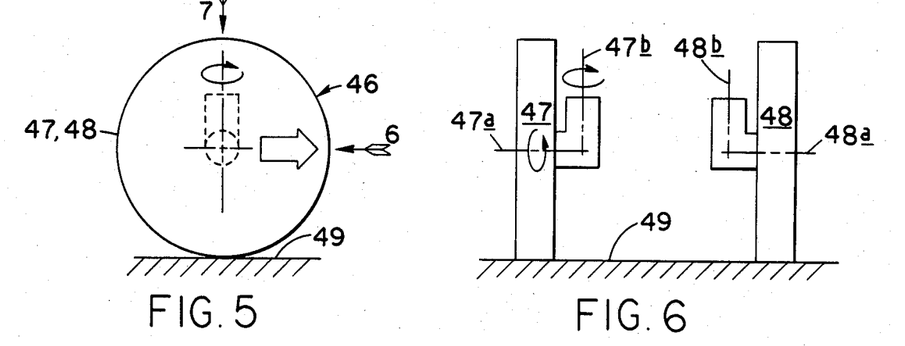
FIG. 5 is a diagrammatic side elevational view of a wheel steering mechanism.
FIG. 6 is a front elevational view of a wheel steering mechanism taken in the direction of arrow 6 of FIG. 5.
Figures 5A, 6A:
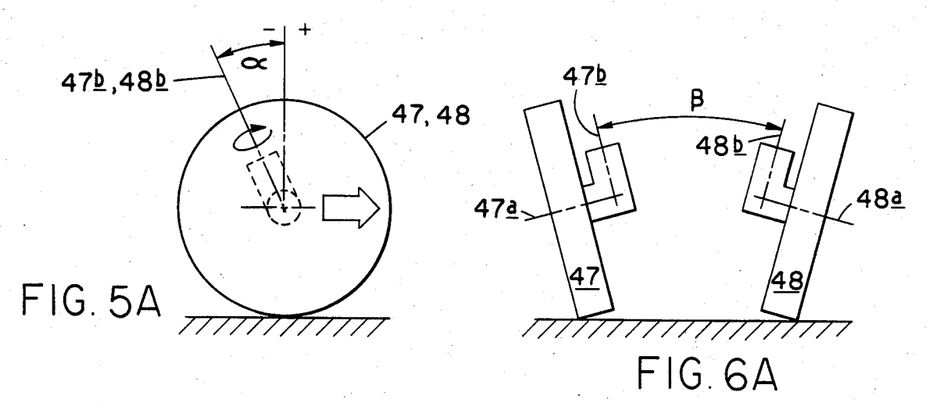
FIG. 5a is an alternate arrangement of the elements of FIG. 5.
FIG. 6a is an alternate arrangement of the elements of FIG. 6.
Figure 7:
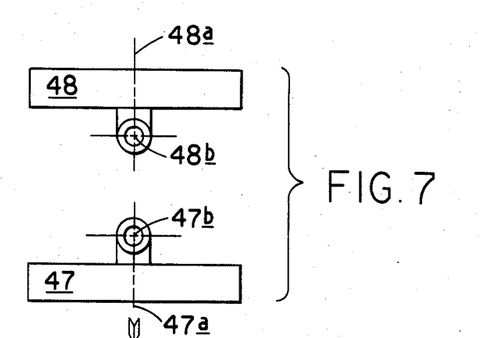
FIG. 7 is a plan view of a wheel steering mechanism taken in the direction of arrow 7 of FIG. 5.

In order to provide a background for the terminology for geometry used herein, a simplified structure for a wheel steering mechanism 46, such as might be employed in automobiles, is depicted in FIGS. 5, 6, and 7 wherein a pair of parallel wheels 47,48 are arranged for rotation about wheel axes 47a,48a, of rotation which are parallel to a surface 49 in contact with the wheels 47,48. Knuckle axes 47b,48b are arranged in a vertical attitude so that the wheels 47,48 may be swiveled on the contact surface 49. FIG. 5a depicts a side view of the wheels of FIG. 5, wherein the (previously) vertical knuckle axes 47b,48b have been tilted backward through an angle alpha to increase stability of the mechanism 46 when moving in the direction of the broad arrow. The condition depicted is referred to as negative caster. If the knuckle axis 47b is tilted to a forward angle, the resulting condition would be positive caster.

FIG. 6a depicts the wheels of FIG. 6 wherein the wheels 47,48 are closer together at the bottom thereby tilting the knuckle axes 47b,48b through an included angle alpha. The condition depicted is referred to as positive camber, and angle beta is referred to as the camber angle.

Figure 7A:
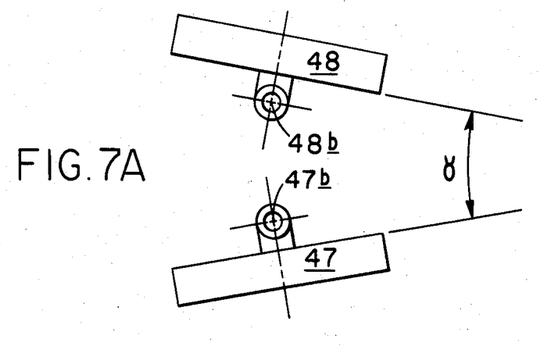
FIG. 7a is an alternate arrangement of the elements of FIG. 7.

FIG. 7a depicts the plan view of FIG. 7 with the wheels 47,48 swiveled about the vertical knuckle axes 47b,48b so that the wheels 47,48 are closer together at the front, i.e., the wheels 47,48 converge through an included angle gamma to a forward point. The condition depicted is referred to as toe-in. Conversely, if the wheels 47,48 are swiveled about their respective vertical axes 47b,48b so that they diverge at the forward end, the condition is referred to as toe-out.

Figure 8:
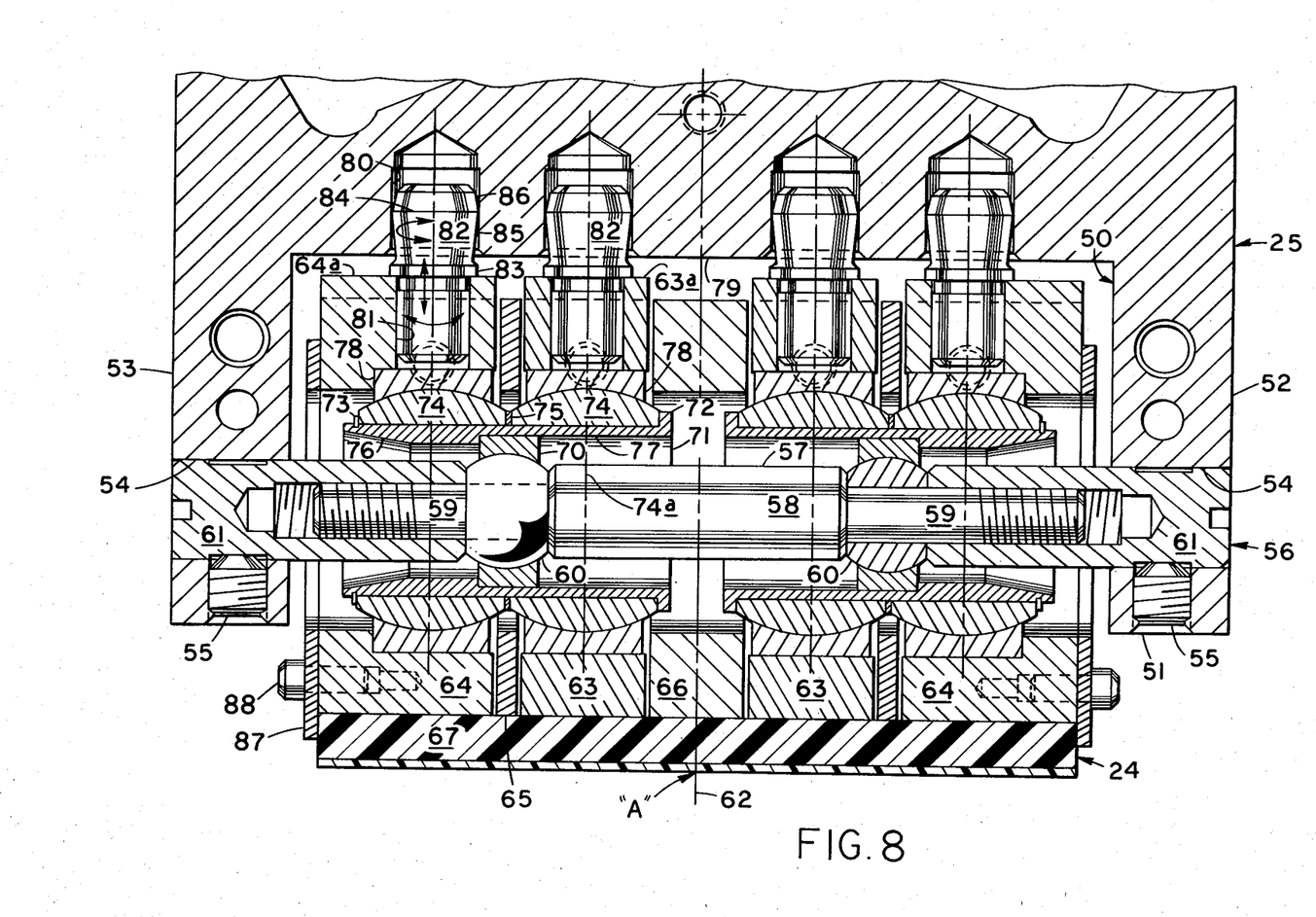
FIG. 8 is a front elevational section through the presser member assembly of FIG. 2.
Figure 9:
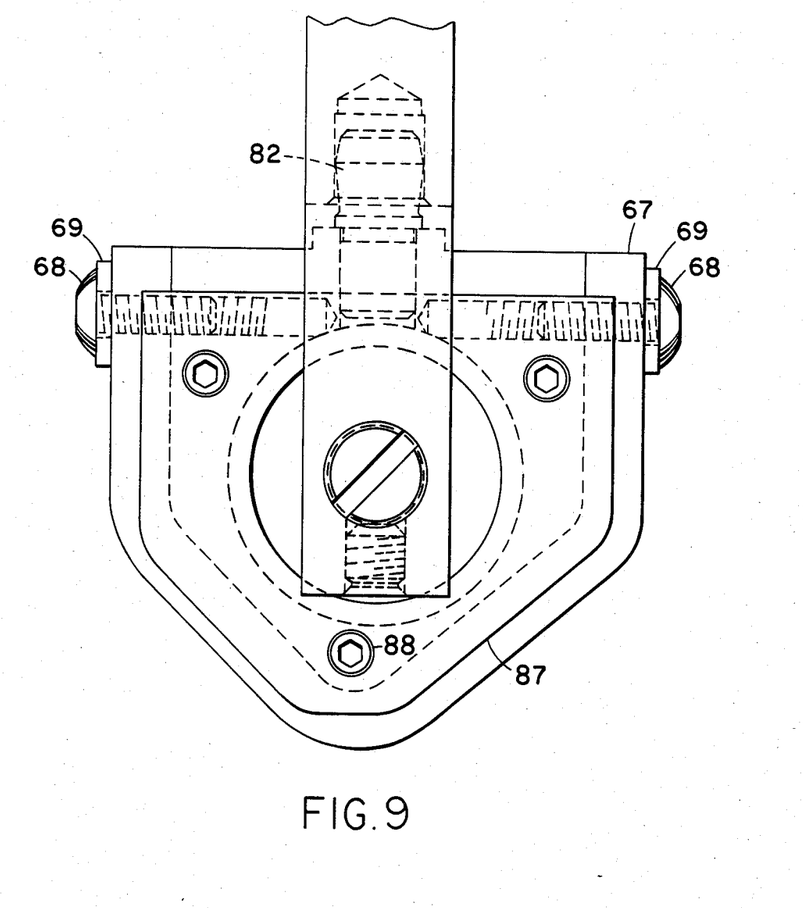
FIG. 9 is a side elevational view of the elements of FIG. 8.

With the shoe-type presser member, force divider, and relative wheel geometry conditions previously defined as a background, reference may be had to FIG. 8, which is an elevational section through the cam plate 25, or yoke, and presser shoe assembly 24 of FIG. 2. The yoke 25 has a large, downwardly opening slot 50 machined into its bottom surface 51, resulting in right and left yoke legs 52,53. The legs 52,53 have in-line bores 54 and side set screws 55 for captivating an axle assembly 56. The axle assembly 56 consists of a central shaft 57 having an enlarged center section 58 and smaller threaded stud portions 59 extending from each end. A bored ball segment 60 is received on each stud portion 59 and a cylindrical sleeve nut 61 is finally received on the stud portion 59 to clamp the ball segments 60 and central shaft 57 into a unitary axle assembly 56. The axle assembly 56 is retained by the side set screws 55 so that the assembly 56 does not rotate. Since the shoe assembly 24 is essentially symmetrical about a vertical central axis 62, which intersects axis "A" on the tape laydown surface 15, only the left-hand portion will be described in detail, the right-hand portion being a mirror image. The shoe assembly 24 has an inboard shoe member 63 and an outboard shoe member 64 spaced by loose fitting plates 65,66 having the same cross-section, i.e., as shown in FIG. 9. The members 63,64 are tied to one another by a common sheet or strip 67 of elastomeric material, for example, silicon rubber, which is held to each member 63,64 by a buttonhead screw 68 received through a clamping washer 69. The strip 67 may be covered with an outer sheet of low-friction material, such as Teflon, a DuPont Company trademark for polytetraflouroethylene (PTFE) plastic. The central ball segment 60 has an outer race 70 mounted thereon with a smooth slip fit, and the outer race 70 supports a tube 71 having a flange 72 at one end and a snap ring 73 at the other which, in turn, serve to retain a pair of outer ball segments 74 on the tube 71. The ball segments 74 are held to a fixed center distance by a washer 75 received axially therebetween. The large bores 76,77 at either end of the tube 71 permit the tube 71 to swivel freely on the inner ball segment 60.

The outer ball segments 74 each have an outer race 78 running with a smooth slip fit secured in respective inboard and outboard shoe members 63,64. The upper slot face 79 has accurate vertical bores 80 machined incline with the center-lines 74a of the outer ball segments 74 when the assembly 24 is in an unstressed or undistorted state. The shoe members 63,64 have vertical bores 81 in their top surfaces inline with the slot bores 80 and knuckle pins 82 serve to link the yoke 25 and shoe members 63,64. The knuckle pin 82 is tightly fitted in the segment member 63,64, having a flange 83 located against the top surface 63a,64a, and a top knuckle pin portion has a full diameter circular contact line 84 with back tapers 85,86 machined from the line 84 to provide relief for the pin 82 in the bore 80. Thus, it can be seen, that the pin 82 may smoothly translate in a vertical direction, axially with the slot bore 80, and the pin 82 may also be swiveled universally in a knuckling action with the bore 80.

Thus, with reference to both FIGS. 8 and 7a, it is readily seen that the inboard and outboard shoe members 63,64 may toe-in or toe-out, owing to the rotatability of the knuckle pin 82 and the distortion of the elastomer which bands the pieces together. Referring to FIG. 8 and FIG. 5a, it may be seen that the tube 71 may be swiveled into the plane of the paper as viewed by the reader, so that one outer ball segment 74 will come forward while the other moves in a rearward direction, thus creating alternating conditions of generally positive and negative caster. If the tube 71 is swiveled up at the outer end and down at the inner end, it will be appreciated that the outboard shoe member 64 will translate slightly to the left while the inboard shoe member 63 translates slightly to the right, the knuckle pins 82 respectively translating axially in their mounting bores 80, so that the shoe members 63,64 assume a position for positive camber as depicted in FIG. 6a multiple combinations of the defined geometries are possible.

Thus, it can be seen that the shoe assembly 24 provides for a flexible mechanism banded together by the undistorted elastomeric strip 67. Outer retaining plates 87 are secured with screws 88 to the outerboard shoe members 64 to assist in keeping the elastomeric strip 67 in position.

ALTERNATE EMBODIMENT

Figure 10:
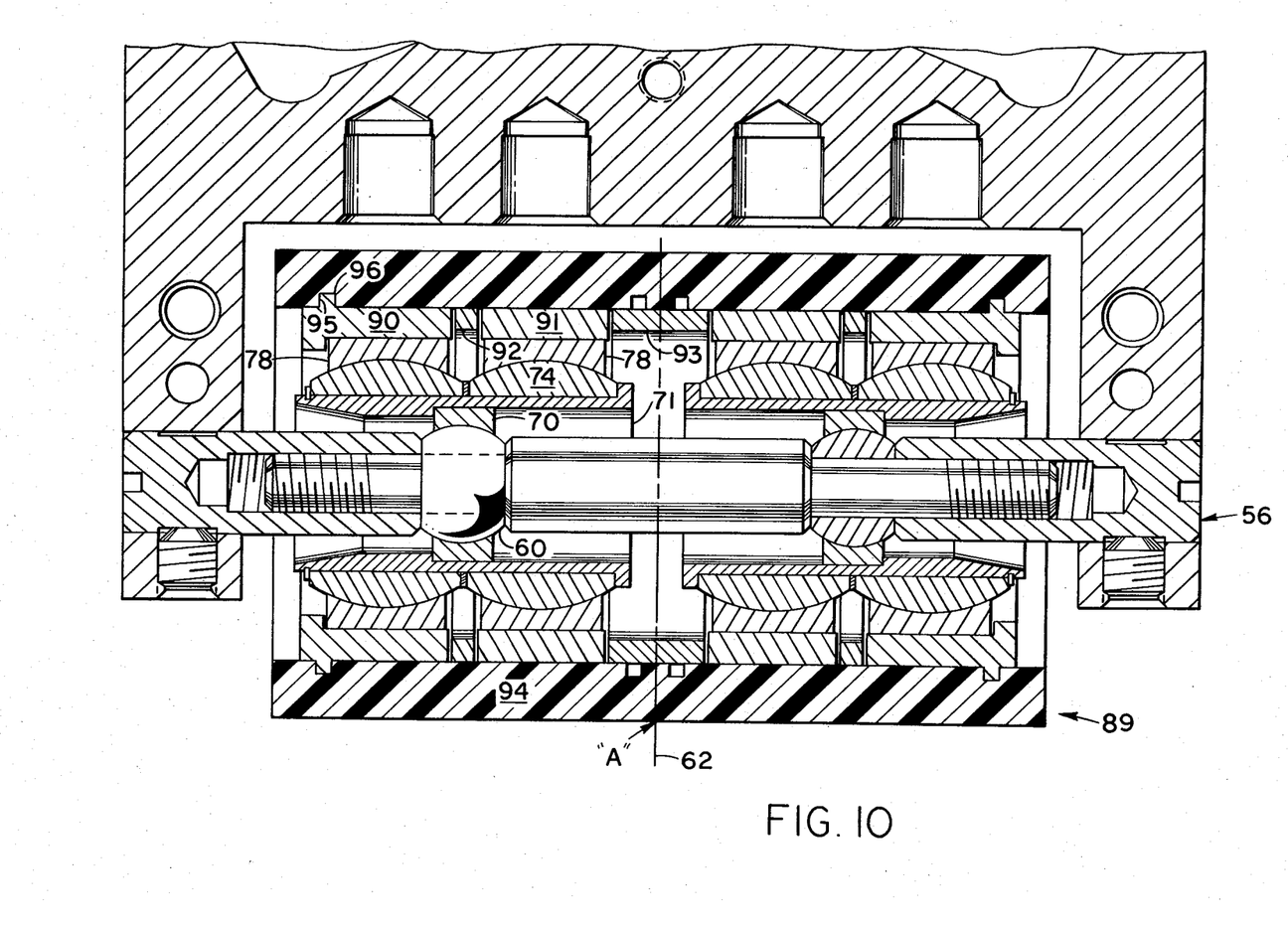
FIG. 10 is a front elevational section through a presser member assembly depicting a roller mechanism as an alternate embodiment to the shoe mechanism of FIG. 8.
Figure 11:
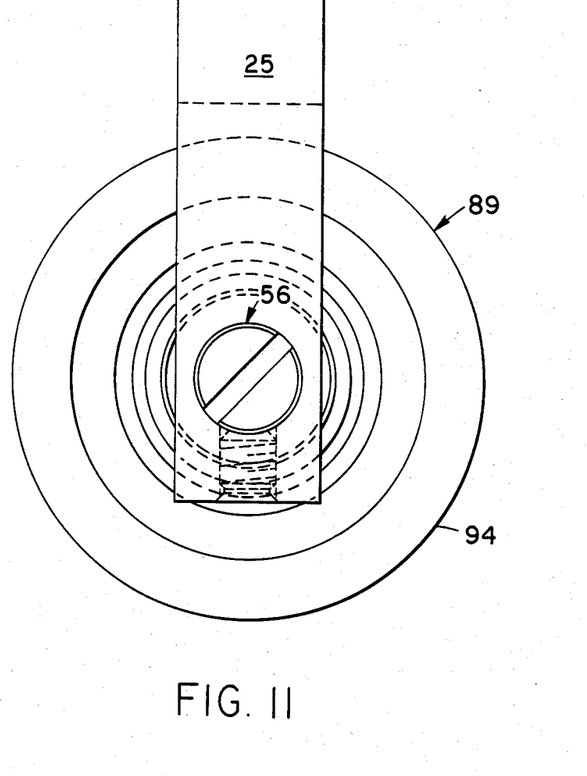
FIG. 11 is a side elevational view of the elements of FIG. 10.

An alternate embodiment of the invention is shown in the roller assembly 89 depicted in the elevational section of FIG. 10 and side view of FIG. 11. The axle assembly 56 is the same as that depicted in FIG. 8, including the ball segments 60,74 and respective races 70,78. Again, the assembly 89 is symmetrically a mirror image about the vertical centerline 62. A cylindrical, flanged roller ring 90 is received on the outboard outer race 78. The inboard race 78 supports an unflanged roller ring 91. Loose-fitting spacer rings 92,93 serve to separate the roller rings 90,91 and an elastomeric sleeve 94 is received over the entire assembly and retained therewith by molded internal grooves 95 received on the flanges 96 of the outboard roller rings 90. The assembly 89 in its undistorted state thus comprises a cylindrical roller journalled on the axle assembly 56. However, it can be seen that the assembly 89 has great universal swivel movement owing to combinations of both the tube 71 on the inner ball segment 60 and the outer roller rings 90,91 on the outer ball segments 74. The yieldable sleeve 94 may be distorted to accommodate various surface contours, and the ball segments 60,74 will accommodate adaptation of the solid members of assembly 89 to the surface contours. Additionally, the ball segments 60,74 will transmit the application force from the tape head 11 through the force dividing characteristics as explained in FIGS. 3, 4a and 4b.

Figure 12:
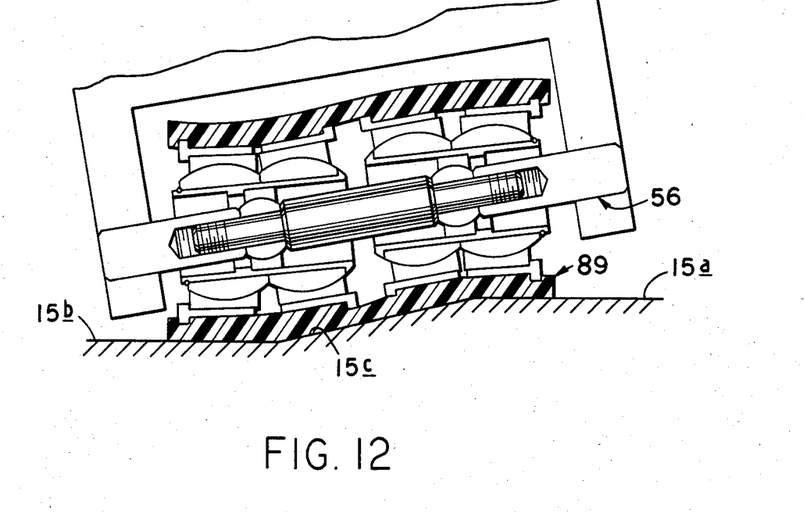
FIG. 12 is a diagrammatic view of the roller mechanism of FIG. 10 applied to a contour surface.

The section depicted in diagrammatic form in FIG. 12 shows exemplary main or parallel contour surfaces 15a,b joined by a slope 15c of approximately one in five. The axle assembly 56 is canted to approximate the slope 15c, while the force-dividing ball segments of the roller assembly 89 permit the sleeve to be distorted to fit adjacent contour surfaces 15a,b,c. As stated previously, when the stress is relieved from the assembly 89, the elastomeric sleeve will tend to bias the entire assembly back to the cylindrical form depicted in FIG. 10.

While the invention has been shown in connection with a preferred embodiment and alternate embodiment, it is not intended that the invention be so limited, but rather the invention extends to all such designs and modifications as come within the scope of the appended claims.

What is claimed is:

1. In a tape laminating machine having a tape laying head for dispensing and pressing tape to a tape laydown surface, and having means for directing a tape laydown force against said laydown surface, a tape presser member assembly carried by said head, comprising:
    (a) a base frame coupled to said head;
    (b) an axle carried by said frame with its longitudinal axis substantially normal to the direction of said tape laydown force to transmit said force radially through said axle;
    (c) force divider means carried by said axle for dividing said radial force into at least two separate radial components;
    (d) at least two solid members in contact with said force divider means, said members including means for mounting said members and providing limited movement of said members in multiple directions;
    (e) a distortable presser strip spanning and connected to said members; and
    (f) means for stabilizing and biasing said presser strip into an undistorted shape.

2. The tape presser assembly of claim 1, wherein said distortable presser strip comprises an elastomer.

3. The tape presser assembly of claim 1, wherein said force divider means comprises cooperating first inner and outer spherical raceways carried by said axle and a pair of cooperating second inner and outer spherical raceways carried by said first outer spherical raceway, the spherical center of said second inner raceways being spaced apart and non-coincident with the spherical center of said first inner raceway.

4. The tape presser assembly of claim 1, wherein said solid members are arcuate members, and wherein said presser strip subtends an arc of circumference on said members.

5. The tape presser assembly of claim 1, wherein said solid members ae cylindrical rings, and wherein said presser strip is a cylindrical sleeve fitted to said rings.

6. The tape presser assembly of claim 5, wherein said cylindrical sleeve is an elastomeric tube.

7. In a tape laminating machine having a tape laying head for dispensing and pressing tape to a tape laydown surface, and having means for directing a tape laydown force against said laydown surface, a tape presser member assembly carried by said head, comprising:
    (a) a base frame coupled to said head;
    (b) an axle carried by said frame with its longitudinal axis substantially normal to the direction of said tape laydown force to transmit said force radially through said axle;
    (c) a pair of force divider means axially-spaced on said axle, each carrying approximately half of the total radial force and each dividing its respective half of the force into two separate radial components;
    (d) at least four solid members in contact with said pair of force divider means, said members including means for mounting said members and providing limited movement of said members in multiple directions;
    (e) a distortable presser strip spanning and connected to said members; and
    (f) means for stabilizing and biasing said presser strip into an undistorted shape.

8. The tape presser assembly of claim 7, wherein said distortable presser strip comprises an elastomer.

9. The tape presser assembly of claim 7, wherein each of said pair of force divider means comprises a cooperating first inner and outer spherical raceways carried by said axle and a pair of cooperating second inner and outer spherical raceways carried by said first outer spherical raceway, the spherical center of said second inner raceways being spaced apart and non-coincident with the spherical center of said first inner raceway.

10. The tape presser assembly of claim 7, wherein said solid members are arcuate members, and wherein said presser strip subtends an arc of circumference on said members.

11. The tape presser assembly of claim 7, wherein said solid members are cylindrical rings, and wherein said presser strip is a cylindrical sleeve fitted to said rings.

12. The tape presser assembly of claim 11, wherein said cylindrical sleeve is an elastomeric tube.

* * * * *